United States Patent
Sayenko et al.

(10) Patent No.: US 10,785,687 B2
(45) Date of Patent: Sep. 22, 2020

(54) INTER-NODE B HANDOVER IN HSDPA OR MULTI-FLOW HSPA INCLUDING PACKET RETRANSMISSION

(75) Inventors: Alexander Sayenko, Espoo (FI); Jani Matti Johannes Moilanen, Helsinki (FI); Hans Thomas Hoehne, Helsinki (FI); Isman Bazar, Tokyo (JP); Karri Markus Ranta-Aho, Espoo (FI); Jeroen Wigard, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 389 days.

(21) Appl. No.: 14/238,862

(22) PCT Filed: Jul. 10, 2012

(86) PCT No.: PCT/EP2012/063490
§ 371 (c)(1),
(2), (4) Date: Oct. 1, 2014

(87) PCT Pub. No.: WO2013/023842
PCT Pub. Date: Feb. 21, 2013

(65) Prior Publication Data
US 2015/0029998 A1 Jan. 29, 2015

(30) Foreign Application Priority Data
Aug. 16, 2011 (WO) .............. PCT/EP2011/064094

(51) Int. Cl.
*H04W 36/00* (2009.01)
*H04W 36/02* (2009.01)
*H04L 5/00* (2006.01)

(52) U.S. Cl.
CPC ....... *H04W 36/0016* (2013.01); *H04W 36/02* (2013.01); *H04L 5/0098* (2013.01); *H04W 36/0069* (2018.08)

(58) Field of Classification Search
CPC ..... H04W 36/02–023; H04W 36/0016; H04W 76/06; H04L 5/001; H04L 5/0035; H04L 5/0098
See application file for complete search history.

(56) References Cited

U.S. PATENT DOCUMENTS

2006/0240830 A1* 10/2006 Ranta-aho ......... H04W 36/0055 455/436
2006/0286985 A1* 12/2006 Pedersen ............... H04W 36/02 455/445

(Continued)

FOREIGN PATENT DOCUMENTS

| EP | 1771032 A2 | 4/2007 |
|---|---|---|
| WO | WO03/047155 A1 | 6/2003 |

OTHER PUBLICATIONS

Toskala et al; "WCDMA for UMTS: Radio Access for Third Generation Mobile Communications, High-speed Downlink Packet Access"; Sep. 1, 2004; p. 307-345.

*Primary Examiner* — Marcus Smith
(74) *Attorney, Agent, or Firm* — Harrington & Smith (57) ABSTRACT

The application relates to the removal of one of the links in multi-flow HSPA but the proposed method is also applicable to normal HSDPA operation during handover. In particular the application aims at minimizing the negative impact of a removed radio link, i.e. drop of packets and/or delays. According to the proposed method, in which the radio link to be removed is via a first Node B NB1 (RL Removal Req), the NB1 ends the pending data transmission and informs the controlling RNC about the data which was not transmitted, in particular in the form of the lowest sequence number in its buffer. Subsequently, the RNC decides, based on this sequence number, which data packets need to be retransmitted on a second radio link via a second node B NB2, and instructs NB2 accordingly (Data Forwarding).

7 Claims, 4 Drawing Sheets

(56) References Cited

U.S. PATENT DOCUMENTS

| | | | |
|---|---|---|---|
| 2008/0310367 A1 | 12/2008 | Meylan | 370/331 |
| 2009/0268637 A1* | 10/2009 | Chen | H04W 36/02 370/254 |
| 2010/0027503 A1* | 2/2010 | Eravelli | H04W 36/02 370/331 |
| 2011/0317642 A1* | 12/2011 | Eravelli | H04L 49/90 370/329 |
| 2012/0163338 A1* | 6/2012 | Zhang | H04W 36/0083 370/331 |
| 2012/0281548 A1* | 11/2012 | Lin | H04W 36/30 370/242 |

* cited by examiner

INTER-NODE B HANDOVER IN HSDPA OR MULTI-FLOW HSPA INCLUDING PACKET RETRANSMISSION

FIELD OF THE INVENTION

The invention generally relates to data forwarding in multi-point transmission. More particularly, the invention relates to efficient data forwarding and retransmission for data split multi-point wireless broadband systems during link removal.

BACKGROUND OF THE INVENTION

Current development and standardization of wireless communications networks is characterized by a number of dimensions where further enhancements are considered. One of those dimensions is multi-point transmission, in which data is scheduled from more than one transmission point, for example more than one base station.

One of the multi-point transmission schemes, which hence will be referred to as Multi-flow, is characterized by splitting the application level data into several flows and sending each flow from a particular base station. In this setup, a few technical challenges arise when a mobile station or user equipment (UE) experiences mobility, thereby causing removal of one of the radio links from the participating set and possible loss of data as a result of this action.

Failing to provide fast and efficient retransmission of data may impact negatively the Multi-flow concept because it is expected to be activated at the cell edge, where Multi-flow brings the highest gains, but at the same time is vulnerable to the removal of a radio link and data losses.

The major focus is on 3GPP HSPA, but it is not limited only to that particular type of wireless communications network.

Multi-flow is a multi-point transmission scheme, which is characterized by splitting the application level data into several independent streams and sending them over different radio links, for example different cells. Based on existing simulation results, higher gains are achieved at the cell edge, where signal strength from transmitting cells is comparably the same, thus allowing a UE to receive data simultaneously from several cells.

However, the cell edge is characterized by the fact that one of the links may fade and/or experience a significant performance degradation, therefore causing its removal by the network from the participating set of radio links in the multi-point transmission scheme. In turn, this may result in data loss in the base station buffers, leading to performance degradation of higher layer protocols, such as TCP.

Currently, two data flow splitting options have been considered inside 3GPP as a part of the HSPA multipoint transmission scheme. The difference between them is the point at which the application level data is split: either at the RLC level or at the PDCP. However, regardless of the approach taken, both RLC and PDCP splits suffer from the problem of dropped packets upon radio link removal. The only difference between these solutions is that the RLC solution has an intrinsic mechanism of ACK/NACK that allows a UE to detect later that some packets are missing and recover from this situation. In case of PDCP, the problem is more critical since the UE does not have such a built-in solution. As a result, regardless of the approach taken, the network is expected to implement some mechanism to minimize the negative impact of a removed radio link.

Solutions to this problem have so far provided techniques that the network can implement to avoid packet losses upon the radio link removal, such as those employed during a seamless handover. However, in the case of Multi-flow, the problem becomes more challenging, since data is initially split into several flows. Therefore, it is not only necessary to detect missing packets, but also to perform proactive actions regarding retransmission of data previously sent to the removed link. This requires the UE and the network to perform additional actions.

The invention seeks to solve at least some of the above-mentioned problems.

SUMMARY OF THE INVENTION

Accordingly, the invention provides a method, which includes determining that a first radio link is to be dropped, ending a pending data transmission on the first radio link, determining which data of the pending data transmission needs to be transmitted, and forwarding the data of the pending data transmission on a second radio link.

In this way, data that was scheduled to be transmitted to a user equipment on a failed or removed radio link can simply be forwarded on a second radio link, which means that data packets are not lost upon failure of a radio link. The first and second radio links are data links to the same user equipment. Furthermore, it is not required to detect lost data packets or perform retransmission of lost data packets, thereby avoiding UE involvement and additional actions on the part of the network.

The step of forwarding may include sending an instruction from a control node to a network node that the network node should schedule said data of said pending data transmission over said second radio link.

Upon radio link removal or failure of the first radio link, a control node (e.g. a radio network controller (RNC)) can instruct a network access node (e.g. a Node B) providing the second radio link to schedule data of the pending data transmission on the second radio link to a corresponding UE as quickly as possible.

Alternatively, the network node may automatically schedule the data of the pending data transmission on the second radio link, without any instruction from the control node.

In one embodiment, the step of ending the pending data transmission includes starting a timer and transmitting data of the pending data transmission on the first radio link until expiry of the timer.

The step of ending the pending data transmission may include clearing data of the pending data transmission from a buffer of a network node used to establish the first radio link.

In one embodiment, the method includes signalling a lowest transmission sequence number of data of said pending data transmission that was in the buffer upon clearing of the data.

The method may further include signalling that the pending data transmission on the first radio link has ended. The signalling can include an indication of whether there is still data to be transmitted on the first radio link.

The invention also provides a control node, which includes a processing unit configured to determine that a first radio link is to be dropped, configured to end a pending data transmission on the first radio link, and configured to determine which data of the pending data transmission needs to be transmitted. A transmitter is configured to forward the data of the pending data transmission on a second radio link.

Preferably, the transmitter is further configured to signal instructions to a network node to end the first radio link.

The invention further provides a network node. The network node includes a transmitter configured to transmit data on a first radio link and a processing unit configured to end a pending data transmission on the first radio link upon removal of the first radio link.

A scheduler in the network node may automatically schedule data on a second radio link or it may receive instructions from a control node to do so.

In one embodiment, the network node further includes a receiver, which is configured to receive instructions from a control node to end the first radio link.

In one embodiment, the network node includes a timer. Data of the pending data transmission can be sent on the first radio link until expiry of the timer. The timer can have a value, within which a scheduler in the network node should transmit pending data.

In one embodiment, the network node includes a buffer so that ending the pending data transmission over the first radio link involves clearing data of the pending data transmission from a buffer. The network node can remove all data packets of the pending data transmission over the first radio link from its buffers, without further attempting to transmit those.

The transmitter may be further configured to signal that there are still data packets from the pending data transmission over the first radio link remaining in the buffer. This may include signalling a lowest transmission sequence number of data of the pending data transmission that was in the buffer upon clearing of the data.

Preferably, the transmitter may be further configured to signal that the pending data transmission on said first radio link has ended. This signalling may include an indication of whether there is still data to be transmitted on the first radio link.

The invention also provides a computer program product including a program comprising software code portions being arranged, when run on a processor to perform determining that a first radio link is to be dropped, ending a pending data transmission on the first radio link, determining which data of the pending data transmission needs to be transmitted, and forwarding the data of the pending data transmission on a second radio link.

Preferably, the computer program product includes a computer-readable medium on which the software code portions are stored, and/or wherein the program is directly loadable into a memory of the processor.

The invention will now be described, by way of example only, with reference to specific embodiments, and to the accompanying drawings, in which:

DETAILED DESCRIPTION OF EXEMPLARY EMBODIMENTS

Figure 1:
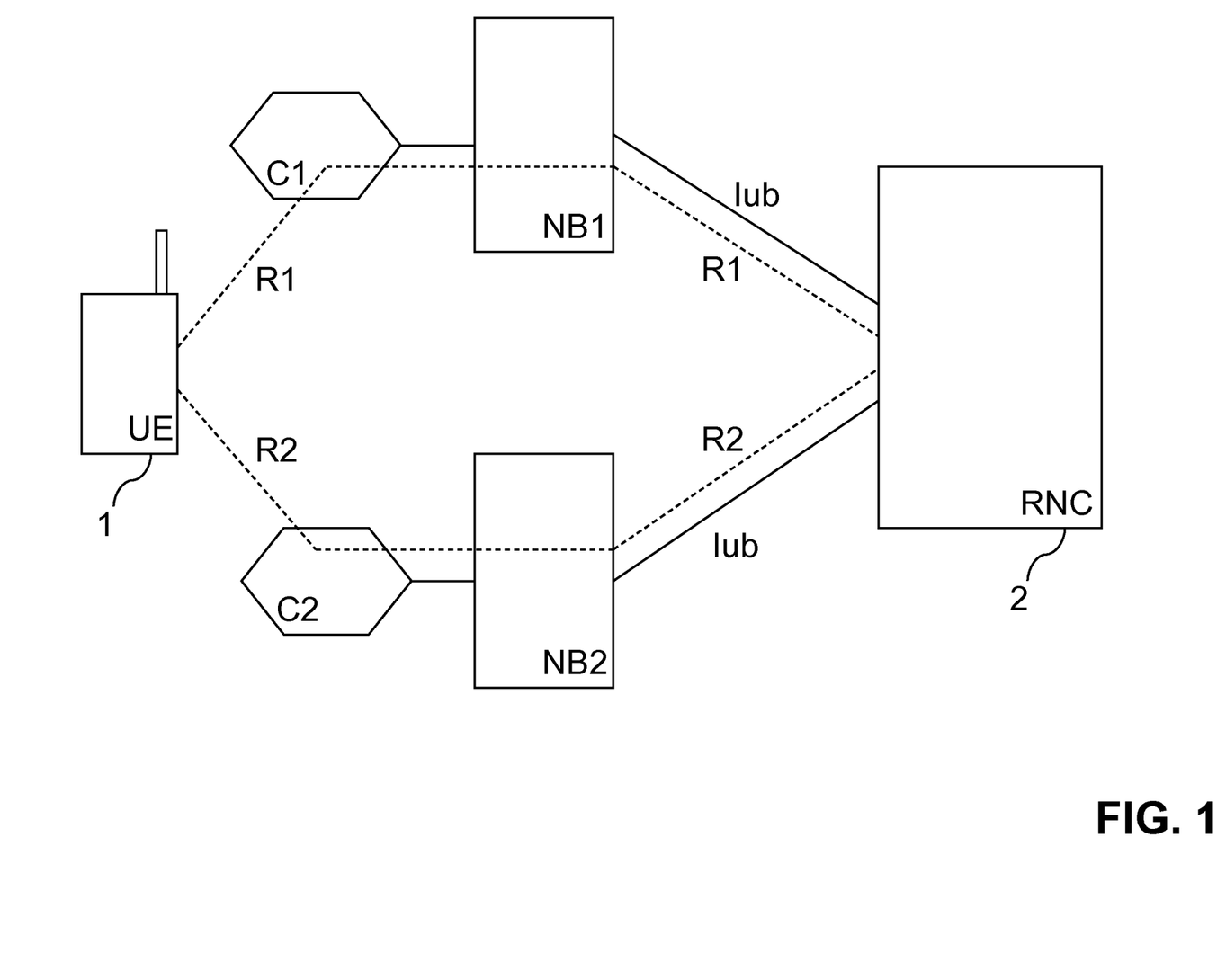
FIG. 1 is a simplified schematic block diagram of a communications network.

FIG. 1 schematically shows a wireless communications network. In the following examples, a WCDMA radio access network is illustrated: however, the invention may also apply to any other kind of wireless network, for example an LTE network.

The network is a Multi-flow wireless system and uses a multi-point transmission scheme. That is, a mobile station or user equipment (UE) 1 may exchange data with the network over two radio links R1 and R2 (in reality more radio links may be used but just two are shown here for simplicity and ease of understanding). The first radio link R1 is via a cell C1 of the network, which is accessed via a Node B NB1 and the second radio link R2 is via a cell C2, which is accessed via a Node B NB2.

The Node Bs NB1 and NB2 are both controlled by a radio network controller (RNC) 2 over an Iub interface so that the radio links R1 and R2 terminate at the RNC 2.

Figure 2:
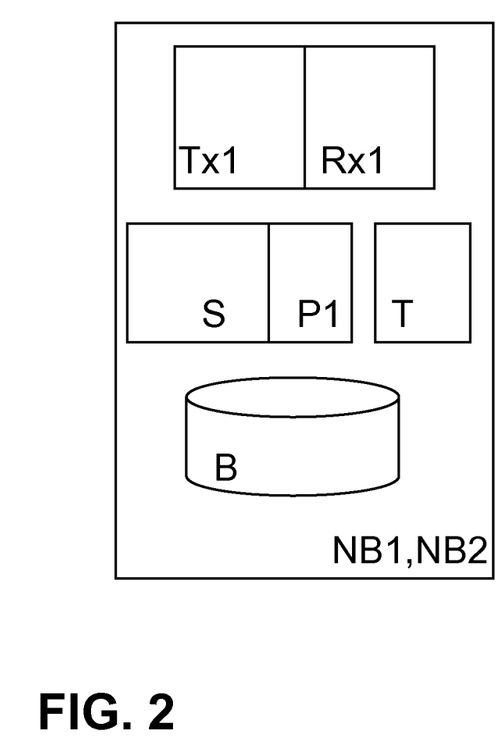
FIG. 2 is a simplified schematic block diagram of a network node for a communications network.
Figure 3:
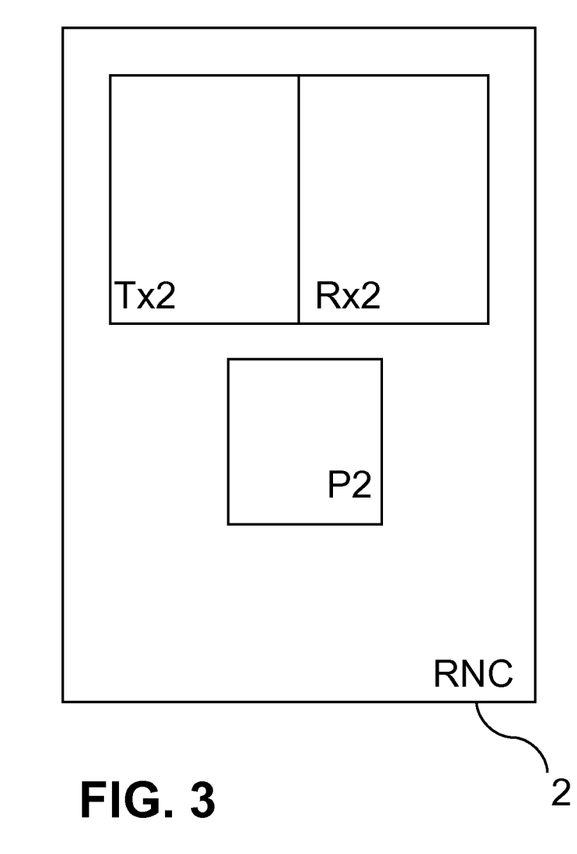
FIG. 3 is a simplified schematic block diagram of a control node for a communications network.

The structures of the Node B NB1, NB2 and the RNC 2 are shown in more detail in FIGS. 2 and 3, respectively.

Each Node B NB1, NB2 includes a transmitter Tx1 and a receiver Rx1 for transmitting and receiving data. A scheduler S is provided for scheduling data transmissions and a buffer B temporarily stores data packets for transmission to the UE 1. The Node B NB1, NB2 further includes a timer T and a processor P1. The RNC 2 includes a transmitter Tx2, a receiver Rx2 and a processor P2.

Figure 4:
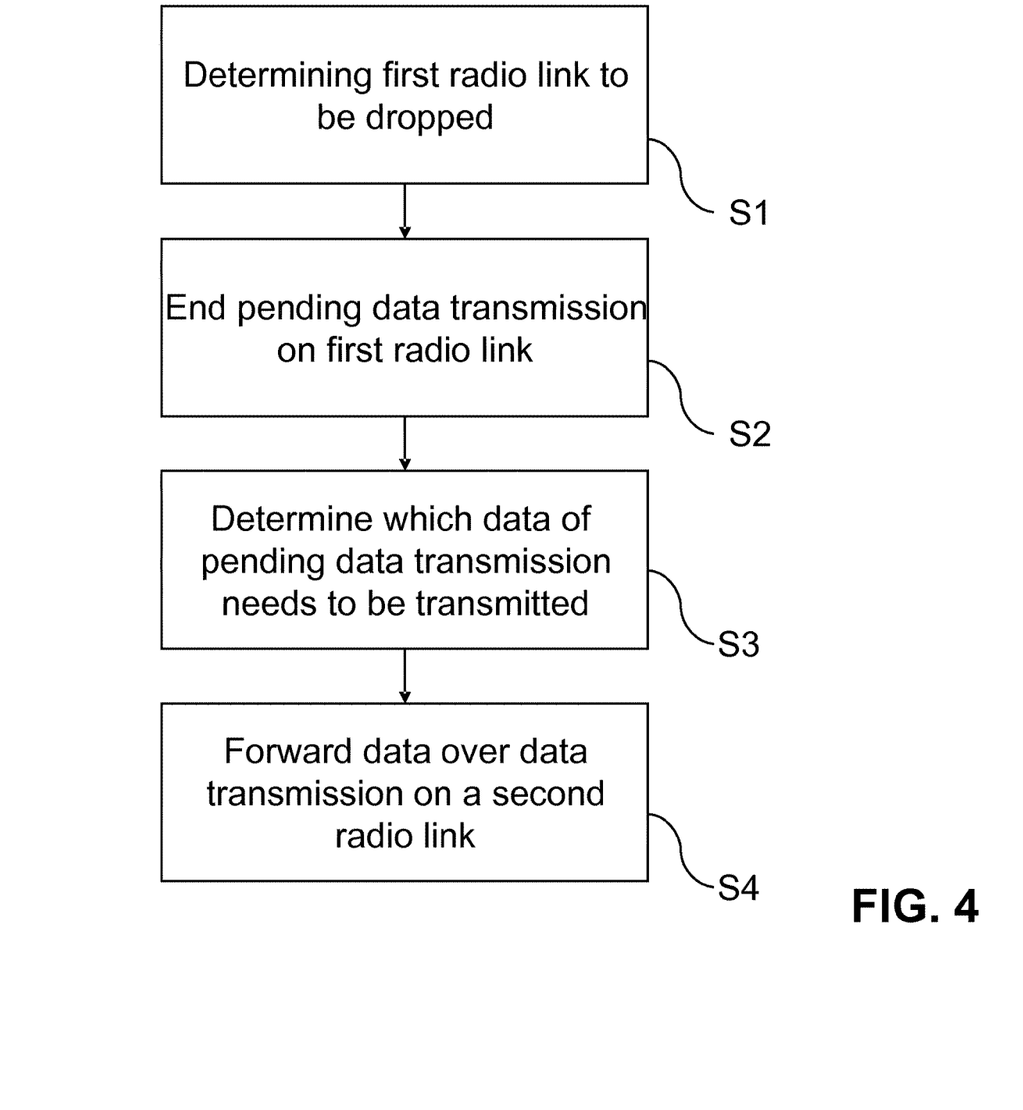
FIG. 4 is a flow chart illustrating a method according to an embodiment of the invention.

A method according to one embodiment of the invention is illustrated in the flow chart shown in FIG. 4.

In Step S1, it is determined that the radio link R1 is about to fail or be dropped. The RNC 2 determines that the radio link R1 is to be deleted, and instructs the Node B NB1 to delete the radio link R1 by stopping or completing pending transmissions. In Step S2, the Node B NB1 ends pending data transmissions either in response to the instruction from the RNC 2, or automatically without instruction. The Node B NB1 confirms deletion of the radio link R1 and indicates the last successful transmission or first pending data packet to the RNC 2. In Step S3, the RNC 2 determines which data packets need to be transmitted and in Step S4 starts efficiently forwarding the pending data packets originally directed to the deleted radio link R1 by expediting those packets compared to other data packets on the radio link R2 scheduled for first transmission via the Node B NB2. Embodiments of the invention are illustrated in more detail in the message flow diagram shown in FIG. 5.

Figure 5:
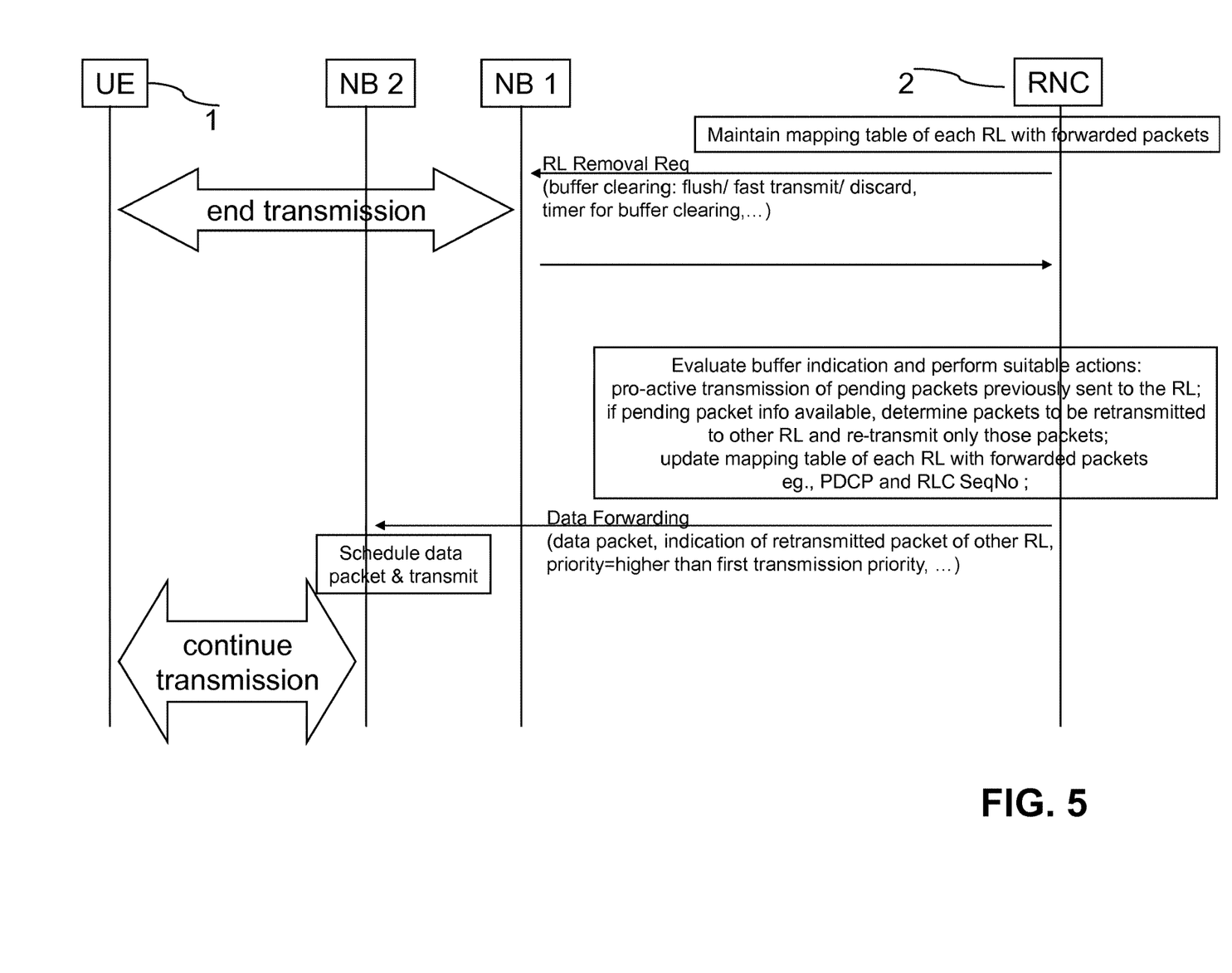
FIG. 5 is a message flow diagram illustrating a method according to an invention.

Upon removal of the radio link R1 via the Node B NB1, e.g., in the radio link removal/change request message, the RNC 2 can instruct Node B NB1 to schedule data from its output buffer B for the correspondent UE 1 as fast as possible. This may also be done automatically by the Node B NB1 without an explicit indication from RNC 2. However, in cases when the RNC 2 is more interested in faster removal of the radio link R1, rather than waiting for transmission of UE data, an explicit indication by the RNC 2 to the Node B NB1 is more preferable.

In one embodiment, the Node B NB1 may also signal a discard operation, where the Node B NB1 removes all data packets of the UE 1 from its buffer(s) B, without further attempting to transmit those data packets.

In one embodiment, a timer value is provided in the timer T, within which the scheduler S of the Node B NB1 should transmit pending data. If it is accompanied by the timer value, then the Node B NB1 can either try to transmit the pending data within the given time interval and/or discard remaining data. For discarding data, the Node B NB1 has several implementation options: either to discard RLC PDU buffers and stop ongoing HARQ processes, or discard only RLC PDU buffers and finish ongoing HARQ processes. Hybrid Automatic Repeat Request HARQ is a combination of forward error correcting coding and an error detection mechanism improving the successful transmissions in poor signal conditions. A HARQ process controls the successful transmission of a PDU.

If the RNC command to send data is accompanied with a timer value, then the Node B NB1 can finish its ongoing HARQ processes and try to send some data from another buffer in the Node B NB1 containing a different type of data, e.g., a buffer for dedicated transmissions between the UE 1 and radio network/for a transport channel dedicated to the UE 1 towards the radio network; the MAC-d buffer.

If removal of the radio link R1 is triggered by an explicit signalling from the RNC 2 to the Node B NB1, the Node B NB1 can indicate in the link removal confirmation message whether there are still data packets in the output buffer B intended for the UE 1. This serves as indication to the RNC 2 as to whether it should take some additional action regarding proactive retransmission of buffered data that were flushed as a result of removal of the radio link R1 in the Node B NB1.

In one embodiment, the Node B NB1 can additionally signal the lowest transmission sequence number SN of data that was in the buffer B upon its removal (or the highest RLC PDU sequence number SN delivered to the UE 1). This assists the RNC 2 in deciding which data to retransmit. The Node B NB1 can also signal the lowest transmission sequence number of data that was in the buffer B upon its removal in the case that the RNC 2 had signalled a discard operation to the Node B NB1.

Having received an indication from Node B NB1 about data contained in the buffer B upon removal of the radio link R1, the RNC 2 can retransmit pro-actively all the unacknowledged data packets previously sent to that link R1. If there is explicit information on the lowest pending transmission sequence number that was in the buffer B, only the relevant data can be retransmitted.

For the purpose of retransmission over a different link radio link R2, the RNC maintains a table with mapping between the PDCP service data unit SN and RLC PDU SN. Once the RNC 2 knows which RLC PDUs were dropped from the buffer B of the Node B NB1, it can schedule relevant PDCP service data units SDUs for retransmission.

While performing retransmissions of relevant RLC PDUs over another Node B NB2, the RNC 2 can use a priority mechanism to ensure that the Node B NB2 handles those data packets first, thus ensuring reduced delays at the re-ordering buffer of the UE 1. The priority mechanisms can be based on using available fields in the Iub flow control signalling (frame protocol). To avoid problems for protocol cross-over, the priority should be given in the radio link R2 to retransmission of data packets from pending data transmissions over the radio link R1 over new transmissions of data packets.

While sending the final confirmation for the UE 1 to remove the radio link R1, the RNC 2 can signal whether it should wait for all the pending transmissions over the radio link R1 to be finished or just send forward completed SDUs from its buffer.

An indication to the Node B NB 1 from the RNC 2 to either schedule data or flush the data from the buffer B is implementable as a simple 1-bit indicator. The advantage of having this bit originates from the fact that the RNC 2 might be interested in removing the link as soon as possible instead of waiting for pending data to be sent. This could be the case when the RNC 2 knows that only a few RLC PDUs were sent to the removed link R1 or if the link conditions of the radio link R1 are already not good enough for the data to be scheduled fast enough. This may also be the case if the RNC 2 decides to retransmit data proactively over the existent link R1 if it knows that this would take less time compared to instructing the Node B NB1 to schedule pending data over a radio link R1 that is already experiencing bad conditions.

An indication to the RNC 2 whether pending data from the output buffers were transmitted successfully or not is also implementable as a simple 1-bit indicator. The 1-bit indicator can accompanied with the lowest sequence number of data that was in the buffer B of the Node B NB1 upon the buffer B being flushed.

In one embodiment, the NodeB NB1 may flush or discard data in the buffer B relevant for the UE1 even if the RNC 2 asks for an explicit transmission of pending data. This is advantageous if the downlink channel performance becomes so bad that there is no way for the Node B NB1 to ensure a reliable data transmission.

It should be noted that under normal functioning, the Node B NB1 does not have to inspect RLC PDU sequence numbers, whereas a need to report back to RNC 2 the sequence number of buffered packets puts an additional requirement to inspect the RLC PDU content. However, this operation must be performed only once for the head of queue RLC PDU.

Alternatively, the Node B NB1 can report back to the RNC 2 just the number of RLC PDUs in the buffer B. Based on this number the RNC 2 can determine which RLC PDUs were discarded in the buffer of the Node B NB1.

In one embodiment, the RNC 2 keeps a mapping between the data sequence number known by the Node B NB1 (i.e. the MAC layer Transmission Sequence Number) with the data sequence number in the RNC 2 (i.e. the RLC Sequence Number)).

Once the RNC 2 receives an indication from the Node B NB1 about a non-empty buffer B upon removal of the radio link R1, it can decide which data should be retransmitted.

In case the lowest sequence number SN is missing, all sent but un-acknowledged PDUs can be immediately sent over the other link radio link R2. Otherwise, only the relevant RLC PDUs will be sent by the RNC 2.

For the case of the PDCP split, the RNC 2 performs an additional step of analyzing which PDCP SDUs to be retransmitted. Since the PDCP split assumes two independent RLC processes, the RLC PDU SN from the RLC process on the removed link R1 must be mapped back to the PDCP SN numbering, from which the RNC 2 takes the relevant PDCP SDUs and sends them over the other radio link R2. In order to facilitate this mapping, the RNC 2 maintains the mapping between PDCP SDU SNs and the RLC process/SN.

While retransmitting RLC PDUs, it is in the interest of the network to ensure that those retransmissions are scheduled ahead of new transmissions. The retransmissions can be prioritized by indicating a higher priority for them in a field of the frame protocol used over the Iub interface.

If the application level data is TCP, or its type is not known, a safer choice for the network is to ensure that pending packets from the removed link R1 are retransmitted to the UE 1, which in turn must wait for missing packets to be delivered by the network.

On the other hand, if the application level protocol is UDP, e.g., contains some streaming data, then the network can decide not to retransmit packets, thus ensuring delays of the streaming content. In this case, to avoid data transmission stall, the RNC 2 informs the UE 1 to ignore the missing PDUs and send forward all the complete PDCP SDUs to a higher layer (e.g. UDP).

Another way to accomplish this is to use an existent RLC mechanism by instructing the UE 1 to move forward its receiving window, which requires an explicit message from the RNC 2.

The above examples are also applicable to normal HSDPA operation during a handover.

For the purpose of the present invention as described hereinabove, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses and network devices, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

The terms "user equipment (UE)" and "mobile station" described herein may refer to any mobile or stationary device including a mobile telephone, a computer, a mobile broadband adapter, a USB stick for enabling a device to access to a mobile network, etc.

The exemplary embodiments of the invention have been described above with reference to a 3GPP UMTS network. However, the above-described examples may be applied to any wireless communications network.

Although the invention has been described hereinabove with reference to specific embodiments, it is not limited to these embodiments and no doubt further alternatives will occur to the skilled person, which lie within the scope of the invention as claimed.

LIST OF ABBREVIATIONS

DL Downlink
HARQ Hybrid automatic repeat request
HSPA High-speed packet access
LTE Long Term Evolution
MAC-d entity of media access control handling the dedicated transport channel between UE and radio network
PDCP Packet data convergence protocol
PDU Packet data unit
RL Radio link
RLC Radio Link Control
RNC Radio network controller
RRC Radio resource control
RRM Radio resource management
SN Sequence number
TCP Transmission Control Protocol
WCDMA Wideband Code Division Multiple Access
UE User equipment
UL Uplink
3GPP $3^{rd}$ Generation Partnership Project

The invention claimed is:

1. A method comprising:
splitting data transmissions to a user equipment between a first network node and a second network node in a multi-flow wireless system using a multi-point transmission scheme in a wireless communications network, said multi-point transmission scheme including a first radio link via a first cell of the wireless communication system to the user equipment and a second radio link via a second cell of the wireless communication system to the user equipment, said first cell being accessed via the first network node and the second cell being accessed via the second network node;
determining that the first radio link is about to fail or be dropped;
instructing said first network node to delete said first radio link by stopping or completing pending data transmissions to said user equipment;
receiving confirmation of a deletion of said first radio link from said first network node and an indication, based on a highest sequence number of data delivered to said user equipment, of a last successful data transmission to said user equipment by said first network node;
determining data of a pending data transmission originally directed to the first radio link, based on a lowest transmission sequence number of data of said pending data transmission in the buffer of the first network node, and needing to be sent to said user equipment; and forwarding said data of said pending data transmission to said user equipment on the second radio link, said data being forwarded with an instruction to said second network node to prioritize said data of said pending data transmission to said user equipment over new transmissions.

2. The method according to claim 1, wherein the step of forwarding comprises sending an instruction to a second network node of said second radio link that the second network node should schedule said data of said pending data transmission on said second radio link.

3. The method according to claim 1, wherein the step of forwarding comprises automatically scheduling said data of said pending data transmission on said second radio link.

4. The method according to claim 1, wherein said indication includes a further indication of whether there is still data to be transmitted on the first radio link.

5. An apparatus comprising:
a receiver;
a transmitter;
at least one processor; and
at least one memory including computer program code, the at least one memory and the computer program code configured, with the at least one processor, to cause the apparatus to perform the following:
split data transmissions to a user equipment between a first network node and a second network node in a multi-flow wireless system using a multi-point transmission scheme in a wireless communications network, said multi-point transmission scheme including a first radio link via a first cell of the wireless communication system to the user equipment and a second radio link via a second cell of the wireless communication system to the user equipment, said first cell being accessed via the first network node and the second cell being accessed via the second network node;
determine that the first radio link is about to fail or be dropped;
instruct said first network node to delete said first radio link by stopping or completing pending data transmissions to said user equipment;
receive confirmation of a deletion of said first radio link from said first network node and an indication, based on a highest sequence number of data delivered to said user equipment, of a last successful data transmission to said user equipment by said first network node;
determine data of a pending data transmission originally directed to the first radio link, based on a lowest transmission sequence number of data of said pending data transmission in the buffer of the first network node, and needing to be sent to said user equipment; and
forward said data of said pending data transmission to said user equipment on the second radio link, said data being forwarded with an instruction to said second network node to prioritize said data of said pending data transmission to said user equipment over new transmissions.

6. The apparatus according to claim 5, wherein the transmitter signals instructions to said first network node to end said first radio link.

7. A computer program product comprising a non-transitory computer-readable storage medium bearing computer program code embodied therein for use with a computer, the computer program code comprising code for performing:

splitting data transmissions to a user equipment between a first network node and a second network node in a multi-flow wireless system using a multi-point transmission scheme in a wireless communications network, said multi-point transmission scheme including a first radio link via a first cell of the wireless communication system to the user equipment and a second radio link via a second cell of the wireless communication system to the user equipment, said first cell being accessed via the first network node and the second cell being accessed via the second network node;

determining that the first radio link is about to fail or be dropped;

instructing said first network node to delete said first radio link by stopping or completing pending data transmissions to said user equipment;

receiving confirmation of a deletion of said first radio link from said first network node and an indication, based on a highest sequence number of data delivered to said user equipment, of a last successful data transmission to said user equipment by said first network node;

determining data of a pending data transmission originally directed to the first radio link, based on a lowest transmission sequence number of data of said pending data transmission in the buffer of the first network node, and needing to be sent to said user equipment; and forwarding said data of said pending data transmission to said user equipment on the second radio link, said data being forwarded with an instruction to said second network node to prioritize said data of said pending data transmission to said user equipment over new transmissions.

* * * * *